(12) United States Patent
Tyson

(10) Patent No.: US 9,591,270 B1
(45) Date of Patent: Mar. 7, 2017

(54) COMBINER DISPLAY SYSTEM AND METHOD FOR A REMOTE CONTROLLED SYSTEM

(71) Applicant: Stephen E. Tyson, Marion, IA (US)

(72) Inventor: Stephen E. Tyson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 727 days.

(21) Appl. No.: 13/973,698

(22) Filed: Aug. 22, 2013

(51) Int. Cl.
*H04N 7/18* (2006.01)

(52) U.S. Cl.
CPC ..................... *H04N 7/18* (2013.01)

(58) Field of Classification Search
CPC ........................................................ H04N 7/18
See application file for complete search history.

(56) References Cited

U.S. PATENT DOCUMENTS

| | | | | |
|---|---|---|---|---|
| 8,874,283 B1* | 10/2014 | Cavote | ................... | B64D 47/08 701/11 |
| 2005/0004723 A1* | 1/2005 | Duggan | ............... | G05D 1/0061 701/24 |
| 2009/0069957 A1* | 3/2009 | Nakamura | ............ | B64C 39/024 701/3 |
| 2009/0112387 A1* | 4/2009 | Kabalkin | ............. | G05D 1/0044 701/23 |
| 2010/0001902 A1* | 1/2010 | Smith | ................... | G01S 5/0294 342/357.48 |
| 2010/0125412 A1* | 5/2010 | Suddreth | ................ | G01C 23/00 701/436 |
| 2016/0132052 A1* | 5/2016 | Seydoux | ............. | G05D 1/0022 701/2 |
| 2016/0176538 A1* | 6/2016 | Bekanich | ............... | B64D 45/00 701/14 |

OTHER PUBLICATIONS

Rockwell Collins, Head-Up Guidance System (HGS) for Midsize and Light Business Aircraft, Apr. 2011 Presentation, 12 pages.

* cited by examiner

*Primary Examiner* — Brian Yenke
*Assistant Examiner* — Sean Haiem
(74) *Attorney, Agent, or Firm* — Donna P. Suchy; Daniel M. Barbieri

(57) ABSTRACT

An apparatus and method can be used with a remote vehicle such as an unmanned aviation system (UAS) or unmanned aviation vehicle (UAV). The system can be an apparatus including a camera, electronics, and a communication unit. The electronics provide a display image on a combiner. The camera is disposed to receive the display image from the combiner and provide a camera image. The communication unit provides data associated with the camera image from the camera to a remote location.

20 Claims, 2 Drawing Sheets

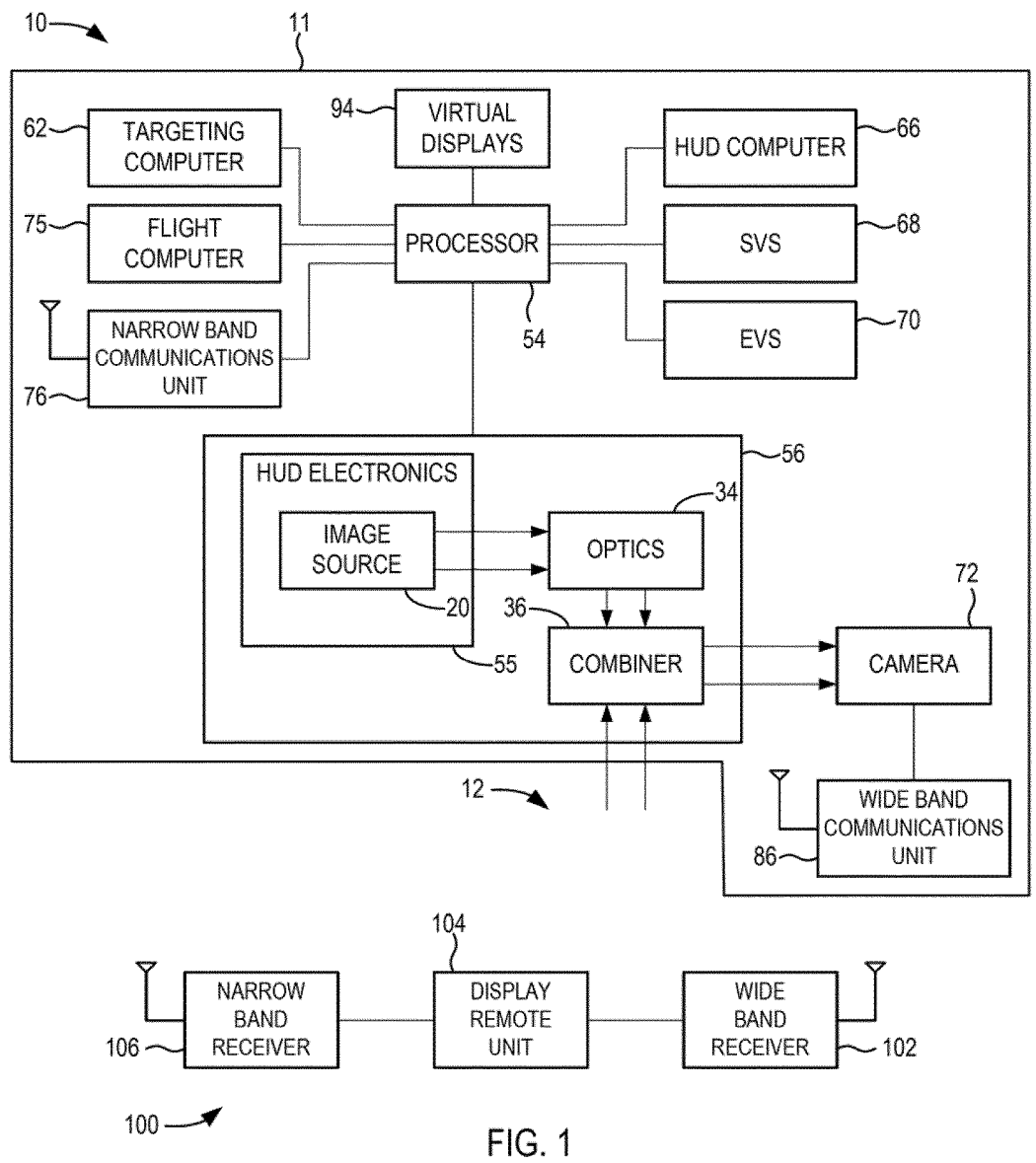
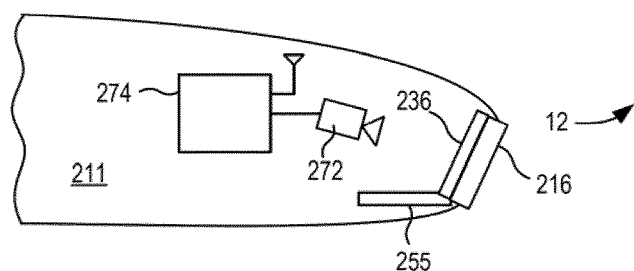
FIG. 1
FIG. 2

COMBINER DISPLAY SYSTEM AND METHOD FOR A REMOTE CONTROLLED SYSTEM

BACKGROUND

The present specification relates generally to the field of displays. More specifically, the specification relates to displays for unmanned vehicle systems (UVSs) or remote monitored or controlled systems, including but not limited to unmanned aviation vehicles (UAVs) or unmanned aircraft systems (UASs).

Remote systems often provide information that is viewable for a user of the remote system. Remote systems include, but are not limited to, robotic equipment, remote vehicles, unmanned vehicle systems (UVSs), aircraft, ships, weapons, boats, naval craft, medical equipment, training simulators, entertainment systems, military equipment, land vehicles, etc. The viewable information can include equipment parameters, operational parameters, location information, video information, remote views, etc.

In one particular UVS application, an unmanned aviation system (UAS) provides flight parameters to the remote operator on a narrow band data link. Typically, the narrow band data link is provided by one or more ARC-210 radios or similar narrow band ultra-high frequency (UHF) radios. For example, on medium and large UVSs, such as, Grey Eagle and larger systems, flight parameters such as altitude, air speed, angle of attack, height above terrain, heading, bearing, etc. are transmitted to a remote operator via narrow band data link.

The UAS often includes a camera on or near the nose of the aircraft to see and avoid other aircrafts and obstacles. Such a camera may be required to operate in civil controlled air space. Images from the camera such as video images are conventionally communicated to the remote operator by an independent video data link that is optimized for wider bandwidth data.

The video data link is not conventionally used for flight parameters because it is not as robust as the narrow band data link provided by ARC-210 radios or similar narrow band UHF radios. In conventional UASs, the video data on the video data link is not synchronized with the flight parameters provided on the narrow band data link. Further conventional systems generally do not include duplicate channel for providing flight parameters from the UAS because the provision of extra radios adds to the size, cost and weight of the UAS.

Thus, there is a need for a low cost, system for and method of providing low weight redundant flight parameter channel. There is also a need for a system for and method of providing flight parameter data and video data to a remote system. There is also a need for a low cost system and method for synchronizing operational data with video data. Further still, there is a need for a display system and method for providing operational parameters of a UVS synchronized with the display of video from the UVS. Further still, there is a need for a low cost, light weight flight parameter display system and method for a UAS.

SUMMARY

An exemplary embodiment relates to an apparatus including a camera, electronics and a communications unit. The electronics provides a display image on a combiner. The camera is disposed to receive the display image from the combiner and provide a camera image. The communications unit provides data associated with the camera image from the camera to a remote location.

Another exemplary embodiment relates to a method. The method includes receiving operational parameters, and providing an image of the operational parameters on a combiner on a remote system. The method also includes receiving the image on the combiner and an image of a scene outside the remote system using a camera, and providing image data from the camera to a receiver remote from the remote system.

Another exemplary embodiment relates to a head up display system for a unmanned aviation system (UAS). The HUD system includes an image source, a combiner for receiving an image from the image source and light from a real world scene, and a camera. The camera provides an image of the combiner. The HUD system also includes a communication unit for transmitting data associated with the image provided by the camera.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a general block diagram of a display system for operational parameters in accordance with an exemplary embodiment;

FIG. 2 is a more detailed block diagram of components of the display system illustrated in FIG. 1 on a remote vehicle in accordance with another exemplary embodiment;

DETAILED DESCRIPTION

Figure 3:
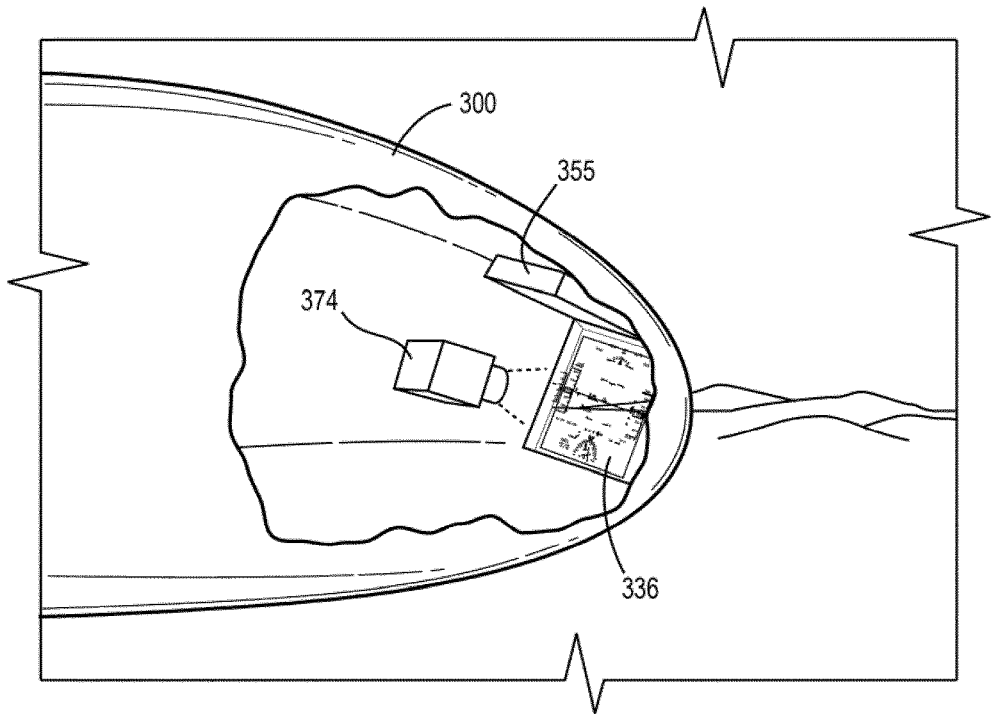
FIG. 3 is a schematic perspective view illustration of components of the display system illustrated in FIG. 1 for use on an unmanned vehicle system in accordance with another exemplary embodiment.

Before describing in detail the particular improved system and method, it should be observed that the invention includes, but is not limited to, a novel structural combination of components and not in the particular detailed configurations thereof. Accordingly, the structure, software, optics, methods, functions, control and arrangement of components have been illustrated in the drawings by readily understandable block representations and schematic drawings in order not to obscure the disclosure with structural details which will be readily available to those of ordinary skill in the art having the benefit of the description herein. Further, the invention is not limited to the particular embodiments depicted in the exemplary diagrams, but should be construed in accordance with the language of the claims.

With reference to FIG. 1, a display system 10 can be utilized with a remote vehicle 11. Remote vehicle 11 can be robotic equipment, unmanned vehicle systems (UVSs), unmanned aircraft systems (UASs), unmanned aviation systems (UAVs), unmanned ships, weapons, unmanned boats, unmanned naval craft, medical equipment, training simulators, entertainment systems, military equipment, unmanned vehicles, etc. Display system 10 includes a remote system 100 for receiving data, video, text, graphics and/or images from remote vehicle 11.

In one embodiment, remote system 100 includes one or more remote display units 104, a narrow band receiver 106 and a wide band receiver 102. Wide band receiver 102 receives video data from remote vehicle 11 and provides the video data for display on remote display unit 104. Narrow band receiver 106 receives data such as operational data from remote vehicle 11 for display on unit 104. Receiver 106 can be an ARC-210 radio or similar device. Receivers 102 and 106 can be transmitter/receivers.

Advantageously, system 10 can be configured so that operational data is provided with the video data associated with receiver 102. In one embodiment, receiver 106 is an ARC-210 radio or similar HF data radio, and wide band receiver 102 is a wide band receiver for receiving video signals. An operator or pilot can monitor operation of remote vehicle 11 via display unit 104. System 100 can also include an interface for controlling operation of remote vehicle 11.

In one embodiment, remote vehicle 11 can include a head up display (HUD) system 56 including a HUD electronics 55, optics 34 and a combiner assembly 36. HUD electronics 55 can also include an image source 20. Combiner assembly 36 is provided proximate an aperture or window in vehicle 11 in one embodiment. Combiner assembly 36 can be used as a window or a layer of a window or aperture in vehicle 11 in another embodiment. In one embodiment, combiner assembly 36 is part of a laminated stack of transparent optical layers associated with a window for vehicle 11.

Vehicle 11 also includes a processor 54, a camera 72 and a wide band communications unit 74. In one embodiment, vehicle 11 can also include a narrow band communications unit 76, targeting computer system 62, flight computer 75, virtual displays system 94, synthetic vision system 68 and enhanced vision system 70. In one embodiment, targeting computer system 62, flight computer 75, virtual displays system 94, synthetic vision system 68 and enhanced vision system 70 are optional. Processor 54 can be a general purpose processor, a digital signal processor, a computer, or other computing platform configured to provide data as described herein. Processor 54 can be part of one or more of HUD electronics 54, systems 62, 68, and 70, or computer 75.

Processor 54 can receive data from targeting computer system 62, flight computer 75, virtual display system 94, synthetic vision system 68 and enhanced vision system 74 and provide signals or data to HUD electronics 55 for eventual display on image source 20. Camera 72 is disposed to receive the image on combiner assembly 36 as well as real world images of an environment 12 outside of remote vehicle 11. In one embodiment, camera 72 is provided to capture an image through combiner assembly 36 and through a window in remote vehicle 11 such that camera 72 captures both data provided on combiner assembly 36 and a real world scene.

In one embodiment, camera 72 is coupled to wide band communications unit 86 such that image data associated with the image captured by camera 72 is provided to system 100 via wide band communication unit 86 and receiver 102. In one embodiment, camera 72 can be coupled to processor 54 or to HUD electronics 55 which can also be coupled to wide band communications unit 74 for providing data. Camera 72 can be a visible light camera and can have night vision capabilities. In one embodiment, camera 72 can be a F-15CD MSIP HUD camera manufactured by Photo-Sonics or a remote head camera manufactured by Photo-Sonics. Various other types of cameras can be utilized without departing from the scope of the invention.

Display system 10 can be utilized in various applications, including but not limited to aviation, medical, naval, targeting, ground-based vehicle, military, etc. In one embodiment, display system 10 is configured for use in remote vehicle or aircraft applications. In one embodiment, display system 10 is utilized in an operational system or a training system to observe and control aircraft or vehicle operation.

In one embodiment, HUD system 56 can use various designs and technologies without departing from the scope of the invention. Image source 20 can provide an image to optics 34 which in combination with combiner assembly 36 provides a collimated image for receipt by camera 72. Combiner assembly 36 can include a half-mirror combiner, a holographic combiner, a substrate waveguide combiner, a parabolic combiner, or any optical device for suitably combining the real world scene with the image from image source 22 for camera 72.

Image source 20 can be any device for providing an image including but not limited to a CRT display, an LED display, an active matrix liquid crystal display (LCD), a light emitting diode, laser illuminator, etc. In one embodiment, image source 20 is a micro LCD assembly or liquid crystal on silicon (LCOS) display and can provide linearly polarized light. Image source 20 can include a laser or LED backlight. Image source 20 can be monochrome or color.

Optics 34 can be disposed between combiner assembly 36 and image source 20. Optics 34 can be a single optical component, such as a lens, or include multiple optical components. Optics 34 can be integrated with or spaced apart from image source 20 and/or combiner assembly 36.

In operation, system 56 provides images from image source 20 to a camera 72 so camera 72 can simultaneously capture the images and a real world scene. The images can include graphic and/or text information (e.g., flight path vector, target icons, symbols, fuel indicators, course deviation indicator, pitch indicator, etc.). The image data can include a virtual display of flight parameters form virtual displays system 94, flight information from flight computer 75, targeting information from targeting computer system 62, a synthetic image from synthetic vision system 68, and an enhanced vision from enhanced vision system 70. The image data can also include a vertical traffic collision avoidance display, terrain avoidance and awareness display, a weather radar display, etc. in one embodiment.

In addition, the images can include synthetic or enhanced vision images which are provided on combiner assembly 36. In one embodiment, the images are provided in a small format that can be enlarged at display unit 104. In one embodiment, the image is enlarged to a lower resolution at unit 104 using a de-zoom algorithm. Alternatively, combiner assembly 36 can be provided with a section that is not disposed in front of an aperture or window of remote vehicle 11, and the enhanced vision image and/or synthetic vision image can be provided on that section of combiner assembly 36 to avoid obscuring the real world view. In one embodiment, flight parameter information can also be provided on that portion of combiner assembly 36.

In one embodiment, collimated light representing the image from image source 20 is provided on combiner assembly 36 so that camera 72 views the image conformally on the real world scene through combiner assembly 36. In one embodiment, combiner assembly 36 is preferably a transparent substrate waveguide combiner. The image provided on combiner assembly 36 by HUD electronics 55 can be provided at a rate less than the capture rate of camera 72. For example, the image on combiner assembly 36 can be provided can be provided at a rate of three times a second and camera 72 can capture images at a rate of 60, 120, or more times per second. The image on combiner assembly 36 can be removed from the real world scene because the entire real world scene is viewable without the flight parameter data for a portion of the samples of data from camera 72. Camera 72 can be coupled to HUD electronics 55 to effect synchronization and image capture times.

In one embodiment, image source 20 is off for 90 percent of the times that camera 72 captures the image. The percentage of times that image source 20 is off can be set by the operator and can be adjusted for certain flight modes and attack modes. For example, greater percentages for display of flight parameters may be desired during takeoff and landing, and lesser percentages for display of flight parameters may be desired during targeting or searching modes. Remote system 100 can have a split view on unit 10—one view for flight parameters by using images captured when image source 20 provides flight data, and one view for the real world scene when image source 20 is off or does not provide flight data in one embodiment.

In one embodiment, the image from source 20 is provided as collimated light and the camera is focused at infinity. In another embodiment, the image from source 20 is provided at a virtual distance less than infinity, and camera 72 is focused at that distance. Camera 72 can be focused at various distances to better identify targets or other objects in the real world scene. The focus of camera 72 can be controlled by an operator or automatically controlled to focus on objects and targets of interest. HUD electronics 55 can receive an indication of the focus of camera 72 and adjust the virtual distance of the image on combiner assembly 36 to match in one embodiment. Optics 34 can include variable focal length optical components (e.g., adjustable lenses) to adjust the virtual distance in response to commands from HUD electronics 55.

Processor 54 can receive information from a variety of sources including one or more of targeting computer system 62, HUD computer system 66, synthetic vision system (SVS) 68, enhanced vision system (EVS) 70, flight computer 75, and virtual displays system 94. In one embodiment, processor 54 can merge information from any one or more of systems 62, 66, 68, 70, and 94 and computer 75 for provision to the pilot in an understandable manner. In addition, camera 72 can provide real world views of environment 12 for merging with data and/or images associated with one or more of systems 62, 66, 68, 70, and 94 and/or computer 75.

Commands from remote system 10 can be provided via communications unit 74 and receiver 106 and provided by processor 54 to systems 62, 66, 68, 70, and 94 and/or computer 75 and to HUD electronics 75. The commands can select particular information to be displayed and formats therefore. In addition, focus selections and image capture parameters can be provided by system 10 via unit 74 and processor 54. Alternatively, commands can be sent and received via unit 86 and receiver 102.

In one embodiment, processor 54 provides virtual display images from virtual displays system 94. Virtual displays systems 94 receives operational data (e.g., flight data) and generates graphical virtual display image data. The operational data can include data from any of systems 62, 66, 68, 70 and 72 and computer 75. For example, flight computer 75 and other sensors can be used to provide data for a virtual primary flight display and other virtual instruments. In one embodiment, the operational data includes vertical speed, air speed, heading, attitude, fuel level, altitude, bearing, yaw, pitch, etc. In one embodiment, system 94 accumulates such data to provide virtual vertical speed indicators, altimeters, tilt displays, yaw displays, air speed indicators, etc. via image source 20.

Advantageously, system 10 provides flight parameter information synchronized with real world scenes for the operator as combiner assembly 36 provides flight parameters with the images of environment 12 received by camera 72. Accordingly, synchronization is automatic with respect to the flight parameters and the real world view. In one embodiment, combiner assembly 36 is provided in front of a transparent window on a nose of the aircraft in front of a sense and detect sensor such as camera 72. Combiner assembly 36 receives an image of all primary flight data in a single display such as scene and tactical information. The image can be provided in a smaller space optimized for the focal length of camera 72. As combiner assembly 36 provides collimated light, camera viewing outside scene 12 can focus on the data provided on camera 36.

Wide band communication unit 86 provides a data link, therefore, for both the flight parameter data associated with the image on combiner assembly 36 and the view of the real world scene. Unit 86 can provide an independent, lower latency data link which provides higher integrity to the control function and facilitating certification for operation in civil air space. Unit 86 communicates with wide band receiver 102. Radio or wide band communications unit 86 can be a Vortex radio manufactured by L3 Communications or a QNT radio manufactured by Rockwell Collins, Inc. in certain embodiments. Radio or wideband receiver 102 can be a ROVER video receiver manufactured by L3 Communications or a StrikeHawk video receiver manufactured by Rockwell Collins, Inc. in certain embodiments.

As unit 74 is already configured for video transmission conventional systems, the use of HUD system 56 does not require additional processing or additional sensors for sensing the image. In addition, the use of combiner assembly 36 allows pilots to view the real world and flight data according to an accustomed fashion. Differences in latency between signals from unit 76 and 74 are advantageously eliminated, thereby reducing confusion with regard to temporal differences.

Remote display unit 104 can declutter the images by removing image on combiner assembly 36, if desired. An algorithm can be used to identify flight data symbols and text and remove such symbols. Alternatively, a timing scheme as discussed above can be used to remove flight parameter information from images of the real world scene. In one alternative embodiment, remote system can provide a signal to HUD electronic 55 to turn off image source 20 so that flight data on combiner assembly 36 is not captured by camera 72.

With reference to FIG. 2, a remote vehicle 211 similar to vehicle 11 (FIG. 1) is a UVS and includes a window 216 associated with combiner assembly 236. In one embodiment, combiner assembly 236 can be integral with window 216. Camera 272 can view the outside scene 12 through window 216 and combiner assembly 236. Camera 272 provides video or image data to wireless communication unit 274 for communication to unit 102 of system remote. 100. HUD electronics 255 are provided in vehicle 211.

With reference to FIG. 3, a remote vehicle 311 similar to vehicle 11 (FIG. 1) is a UVS and includes a single unit window and combiner assembly 336. According to one embodiment, combiner assembly 336 can be part of an HGS-3500 HUD system manufactured by Rockwell Collins, Inc. configured for use in vehicle 311. In one embodiment, combiner assembly 236 includes a combiner that is also the port or window for system 311.

The combiner can be planer in form and can also be used as a window for the UAV or UVS in front of camera 374 that is used for "see and avoid" functions, thereby advantageously performing two functions by forming the window (aperture) for the see and avoid camera and also providing all the relevant pilot flight parameters over a secondary data link that is separate from the normal data link in one embodiment. In one embodiment, the HGS-3500 HUD system provides all of the elements needed for creation of the image, and projection/refraction of the image in a compact unit. The compact unit can also be bent if needed using one or more prisms, enabling it to be packaged more easily into vehicle 311. Additional electronics in the HGS 3500 HUD system can be packaged as they are for the convenience of the pilot, and elements not needed in a UVS environment can be eliminated. Brightness and contrast can be automatically controlled by camera 372 or a controller receiving an ambient light sensor input. Alternatively, brightness and contrast can be controlled by receiving commands from on operator at unit 104 of system 100.

Figure 4:
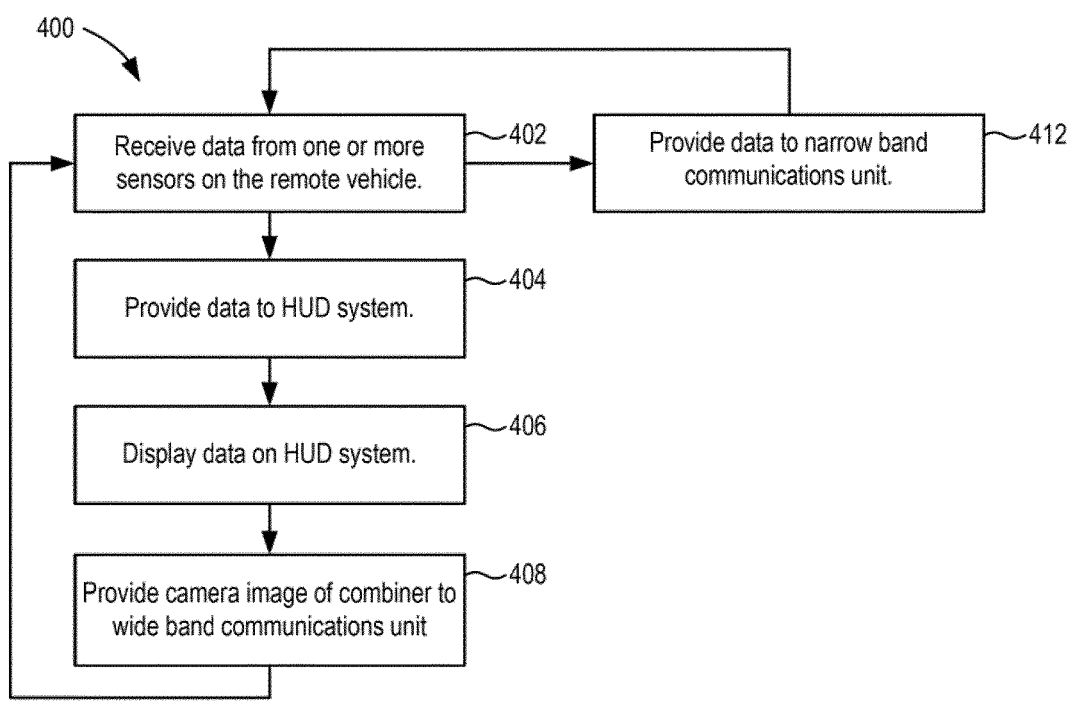
FIG. 4 is a flow diagram showing a method for the display system illustrated in FIG. 1 in accordance with an exemplary embodiment.

With reference to FIG. 4, system 10 can operate in accordance with a method 400. In a step 402, HUD electronics 55 receives data from one or more sensors on remote vehicle 11. At a step 412, data can be provided to a narrow band communication unit 76 for a transmission to remote system 100. At a step 404, the data is provided to HUD electronics 55. At a step 406, the data is displayed on HUD system 55. At a step 408, a camera image of the image on combiner 56 is taken including a view of the real world scene. The camera image is provided by wide band communications unit 74 to system 100. Data can be removed from HUD system 55 and additional camera images of the real world scene can be taken through the combiner assembly in step 408. After steps 408 and 412, system 10 returns to step 402.

While the detailed drawings, specific examples, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for an unmanned vehicle, the apparatus comprising:
    a combiner for disposition in the vehicle;
    a camera for disposition in the vehicle;
    electronics for disposition in the vehicle configured to cause a display image to be displayed on the combiner, the display image comprising information related to operation of the vehicle, the camera being disposed to capture light associated with the combiner and to receive the display image displayed on the combiner and provide a camera image, wherein the combiner is disposed so that an environment is viewable through the combiner, wherein the camera image comprises the display image and at least a portion of an image of the environment viewed through the combiner; and
    a communications unit for disposition in the vehicle and configured to provide data associated with the camera image from the camera to a remote location, the remote location being separate from the vehicle.

2. The apparatus of claim 1, wherein the combiner is disposed in front of a window of an unmanned aviation system or vehicle.

3. The apparatus of claim 2, wherein the window is in a nose cone.

4. The apparatus of claim 1, wherein the combiner is integral with a window of an unmanned aviation system and the vehicle is the unmanned aviation system.

5. The apparatus of claim 4 further comprising:
    a narrow bandwidth radio for providing flight parameters of the unmanned aviation system to the remote location.

6. The apparatus of claim 5, wherein the display image includes the flight parameters.

7. The apparatus of claim 5, further comprising: collimating optics before the combiner and an LCD display associated with the electronics; and wherein the display image is provided using collimated light from the collimating optics.

8. The apparatus of claim 1, wherein the communications unit is a wide band communications unit.

9. The apparatus of claim 8, wherein the combiner is a substrate waveguide.

10. The apparatus of claim 9, wherein the camera is a visible light camera.

11. A method, comprising:
    receiving operational parameters;
    providing an image of the operational parameters on a combiner in an unmanned remote system, wherein light associated with a scene outside of the remote system and the image of the operational parameters is presented on the combiner, the light associated with a scene outside of the remote system being presented through the combiner;
    receiving the image of the operational parameters on the combiner and the light associated with the scene outside the remote system using a camera, the camera being disposed to capture the light associated with the scene outside of the remote system and the image of the operational parameters on the combiner, the light associated with the scene outside the remote system being viewable through the combiner; and
    providing image data from the camera to a receiver remote from the remote system, the image data including the image of the operational parameters on the combiner and the light associated with the scene outside the remote system.

12. The method of claim 11, wherein combiner is provided in front of a window in the remote system.

13. The method of claim 11, wherein the combiner is integral a window in the remote system.

14. The method of claim 13, wherein the remote system is a naval system.

15. The method of claim 14, wherein the camera is a visible light camera.

16. The method of claim 11, wherein the combiner displays text indicating speed and altitude.

17. A head up display (HUD) system for an unmanned aviation system, the HUD system comprising:
- an image source;
- a combiner for receiving an image from the image source and light from a real world scene, the light from the real world scene being provided through a front surface and a rear surface of the combiner;
- a camera for capturing an image of the combiner, the image of the combiner comprising the image from the image source and the light from the real world scene; and
- a communications unit for transmitting data associated with the image captured by the camera.

18. The HUD system of claim 17, wherein the image on the combiner comprises a synthetic vision image or enhanced vision image.

19. The HUD system of claim 18, wherein the communications unit is a video communications unit.

20. The HUD system of claim 19, wherein the combiner is provided in front of a window of the unmanned aviation system.

* * * * *